United States Patent
Shepard (10) Patent No.: US 12,054,019 B2
(45) Date of Patent: Aug. 6, 2024

(54) TRAILER HITCH ANGLE MEASURING DEVICE

(71) Applicant: Daniel Robert Shepard, Stratham, NH (US)

(72) Inventor: Daniel Robert Shepard, Stratham, NH (US)

( * ) Notice: Subject to any disclaimer, the term of this patent is extended or adjusted under 35 U.S.C. 154(b) by 565 days.

(21) Appl. No.: 17/226,327

(22) Filed: Apr. 9, 2021

(65) Prior Publication Data

US 2021/0316580 A1     Oct. 14, 2021

Related U.S. Application Data

(60) Provisional application No. 63/007,780, filed on Apr. 9, 2020.

(51) Int. Cl.
| | |
|---|---|
| *B60D 1/24* | (2006.01) |
| *B60D 1/06* | (2006.01) |
| *B60D 1/62* | (2006.01) |
| *G01B 7/30* | (2006.01) |

(52) U.S. Cl.
CPC ............... *B60D 1/24* (2013.01); *B60D 1/06* (2013.01); *B60D 1/62* (2013.01); *G01B 7/30* (2013.01)

(58) Field of Classification Search
CPC ... B60D 1/24; B60D 1/06; B60D 1/62; G01R 7/30
See application file for complete search history.

(56) References Cited

U.S. PATENT DOCUMENTS

| | | |
|---|---|---|
| 2,050,948 A | 8/1936 | Hekking |
| 3,331,045 A | 7/1967 | Weiss et al. |
| 3,335,384 A | 8/1967 | Weiss |
| 3,833,928 A | 9/1974 | Gavit et al. |
| 3,988,710 A | 10/1976 | Sidor et al. |
| 4,122,390 A | 10/1978 | Kollitz et al. |
| 4,164,737 A | 8/1979 | Hunter |
| 4,205,453 A * | 6/1980 | Steele .................... B60Q 1/305 33/534 |
| 4,395,695 A | 7/1983 | Nakamura |
| 4,696,486 A | 9/1987 | Ruhter |
| 4,846,094 A | 7/1989 | Woods |
| 5,001,637 A | 3/1991 | Shiraishi et al. |
| 5,001,639 A | 3/1991 | Breen |
| 5,152,544 A | 10/1992 | Dierker, Jr. et al. |
| 5,191,328 A | 3/1993 | Nelson |
| 5,247,442 A | 9/1993 | Kendall |
| 5,558,350 A | 9/1996 | Kimbrough et al. |
| 5,579,228 A | 11/1996 | Kimbrough et al. |
| 6,124,709 A | 9/2000 | Allwein |
| 6,199,000 B1 | 3/2001 | Keller et al. |
| 6,222,443 B1 | 4/2001 | Beeson et al. |
| 6,292,094 B1 | 9/2001 | Deng et al. |
| 6,431,576 B1 | 8/2002 | Viaud et al. |
| 6,434,462 B1 | 8/2002 | Bevly et al. |
| 6,553,299 B1 | 4/2003 | Keller et al. |
| 6,577,952 B2 | 6/2003 | Geier et al. |
| 6,668,225 B2 | 12/2003 | Oh et al. |
| 6,956,468 B2 | 10/2005 | Lee et al. |

(Continued)

*Primary Examiner* — Reena Aurora (57) ABSTRACT

The present invention relates to magnetic angle measurement and, in particular, the present invention relates to measuring the hitch angle with a magnetometer formed by a vehicle while coupled with and towing a trailer by measuring the direction to a magnetic field source.

16 Claims, 5 Drawing Sheets

(56) References Cited

U.S. PATENT DOCUMENTS

| | | |
|---|---|---|
| 7,154,385 B2 | 12/2006 | Lee et al. |
| 7,225,891 B2 | 6/2007 | Gehring et al. |
| 7,689,354 B2 | 3/2010 | Heiniger et al. |
| 7,715,953 B2 | 5/2010 | Shepard |
| 7,904,222 B2 | 3/2011 | Lee et al. |
| 9,132,856 B2 | 9/2015 | Shepard |
| 9,156,496 B2 | 10/2015 | Greenwood et al. |
| 9,340,228 B2 | 5/2016 | Xu et al. |
| 9,434,414 B2 | 9/2016 | Lavoie |
| 9,446,713 B2 | 9/2016 | Lu et al. |
| 9,513,103 B2 | 12/2016 | Crossman |
| 9,555,832 B2 | 1/2017 | Smit et al. |
| 9,633,533 B2 | 4/2017 | Skvarce et al. |
| 9,683,848 B2 | 6/2017 | Lavoie et al. |
| 9,694,850 B2 | 7/2017 | Shepard et al. |
| 9,926,009 B2 | 3/2018 | Shepard |
| 10,046,613 B2 | 8/2018 | Shepard |
| 10,065,676 B2 | 9/2018 | Bradley et al. |
| 10,065,677 B2 | 9/2018 | Shepard |
| 10,214,241 B2 | 2/2019 | Shepard |
| 2005/0087121 A1 | 4/2005 | Brown et al. |
| 2005/0206225 A1 | 9/2005 | Offerle et al. |
| 2010/0201506 A1* | 8/2010 | Terry .................. B60D 1/62 340/431 |
| 2011/0112721 A1 | 5/2011 | Wang et al. |
| 2014/0358417 A1 | 12/2014 | Lavoie et al. |
| 2017/0083773 A1 | 3/2017 | Greenwood et al. |
| 2019/0009817 A1 | 1/2019 | Bradley et al. |

\* cited by examiner

TRAILER HITCH ANGLE MEASURING DEVICE

CROSS-REFERENCE TO RELATED APPLICATION

This Utility patent application makes reference to U.S. Pat. No. 7,715,953 (the '953 patent) by Shepard titled "TRAILER BACKING UP DEVICE AND METHOD" which issued on May 11, 2010, U.S. Pat. No. 9,926,009 (the '009 patent) by Shepard titled "PORTABLE TRAILER GUIDANCE SYSTEM" which issued on Mar. 27, 2018, U.S. Pat. No. 10,214,241, (the '241 patent) by Shepard titled "TRAILER BACKING UP SYSTEM ACCESSORIES" which issued on Feb. 26, 2019, U.S. patent application Ser. No. 16/354,567 (the '567 patent application), by Shepard titled "OUTPUT DEVICE FOR TRAILER BACKING SYSTEM" that was filed on Mar. 15, 2019, and claims priority to U.S. Provisional Patent Application 63/007,780 (the '780 provisional), by Shepard titled "TRAILER HITCH ANGLE MEASURING DEVICE" that was filed on Apr. 9, 2020 and those applications are incorporated herein in their entirety by reference.

TECHNICAL FIELD

In various embodiments, the present invention relates to magnetic angle measurement and, in particular, the present invention relates to magnetically measuring the hitch angle formed by a vehicle while coupled with and towing a trailer.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. Various innovations have been introduced to address this problem in whole or in part. Prior art reveals several attempts to address the problems associated with backing a trailer. One component of a trailer backup system is typically a means for measuring the hitch angle which is the angle formed by a line running down the centerline of the vehicle and a line running down the centerline of the trailer. Prior art includes solutions for sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). Shepard in his U.S. Pat. No. 7,715,953 teaches a potentiometer based hitch angle measuring solution. However, potentiometer based solution can fail due to the wearing out of the internal parts of the potentiometer due to friction. Other hitch sensors have been implemented that utilize a magnetic rotation sensor. These sensors have the benefit of much longer operating lifetimes, but because they are mechanical, can be more difficult to install. Other solutions use the vehicle's backup camera and imaging techniques to ascertain the hitch angle, but these solutions can require considerable processing power. Yet other solutions have used a magnetic compass on both the vehicle and the trailer to measure their respective headings and obtain the hitch angle by subtracting one from the other, but these can prove to be unreliable when in the presence of stray magnetic fields.

What is needed is a simple way to measure a hitch angle that has a long lifetime, is easy to install, and can be manufactured inexpensively.

SUMMARY

The present invention relates to magnetic angle measurement and, in particular, the present invention relates to magnetically measuring the hitch angle formed by a vehicle while coupled with and towing a trailer. The present invention utilizes an electromagnet that is placed proximate to the hitch ball of a trailer hitch and a magnetometer that is placed proximate to the hitch ball of a trailer hitch where one is mounted on the trailer side of the hitch ball and moves with the trailer and the other is mounted on the vehicle side of the hitch ball and moves with the vehicle.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawing, in which.

DETAILED DESCRIPTION

The present invention relates to magnetic angle measurement and, in particular, the present invention relates to magnetically measuring the angle formed by a vehicle while coupled with and towing a trailer. A magnetometer can be used to detect the earth's magnetic field in order to determine the direction to magnetic north. Some prior art solutions use a magnetic compass on both the vehicle and the trailer to measure their respective headings and obtain the hitch angle by subtracting one from the other, but these can prove to be unreliable when in the presence of stray magnetic fields. The present invention solves this problem by using a single magnetometer (for example, mounted on the trailer) and a magnet (for example, mounted on the vehicle's hitch ball mount or hitch receiver) to determine the angular direction from the magnetometer to the electromagnet and then using this angle from the magnetometer to compute the angle at the hitch as taught in the '009 patent. (Note that it is likewise contemplated by the present teaching to swap the locations of the magnetometer and the magnet.) The magnet can be a permanent magnet, a rare earth magnet, an electromagnet (which can be energized and de-energized or energized with a first polarity and energized with the opposite polarity), or a mechanically switchable magnet (a mechanically switchable magnet has a stack of magnetic plates where alternate plates can be rotated, perhaps by a low speed or geared motor, so as to align the magnetic fields of all the plates or to reverse the magnetic fields of alternate plates to cancel out the field). Typically, the magnet will be an electromagnet.

Figure 1:
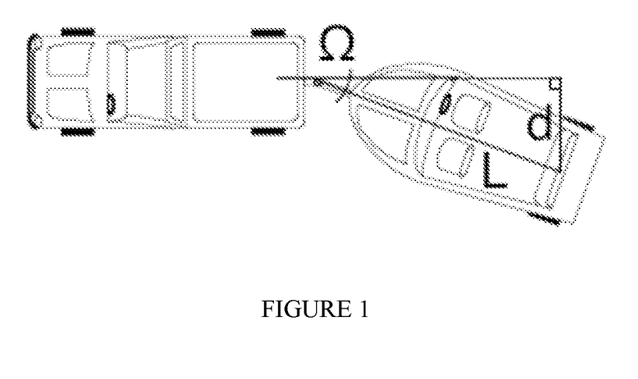
FIG. 1 depicts an angle formed by a vehicle while coupled with and towing a trailer.
Figure 2:
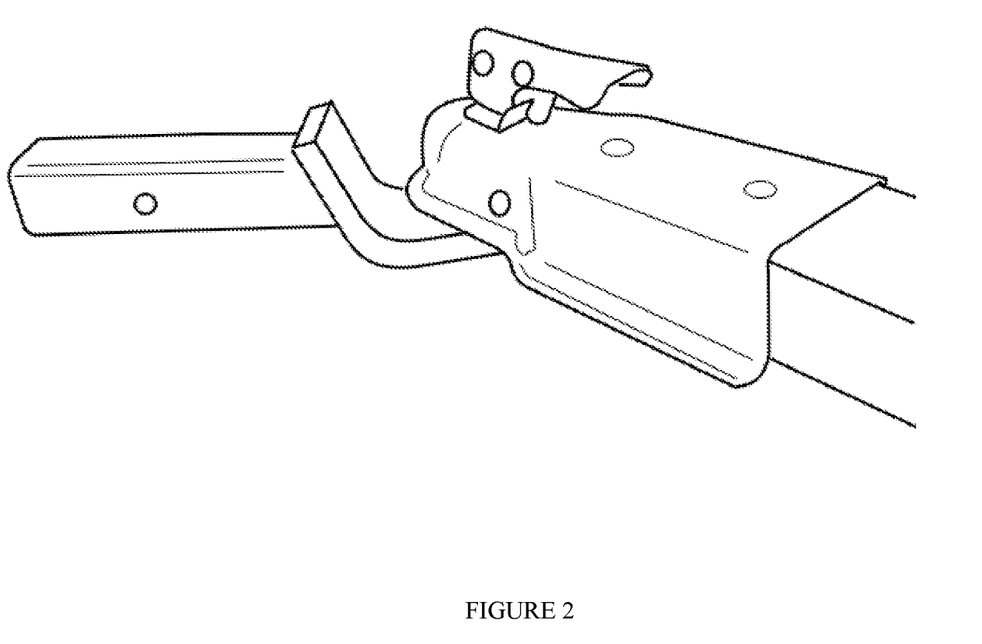
FIG. 2 depicts a typical vehicle hitch receiver with a hitch ball and a trailer tongue coupler.
Figure 3:
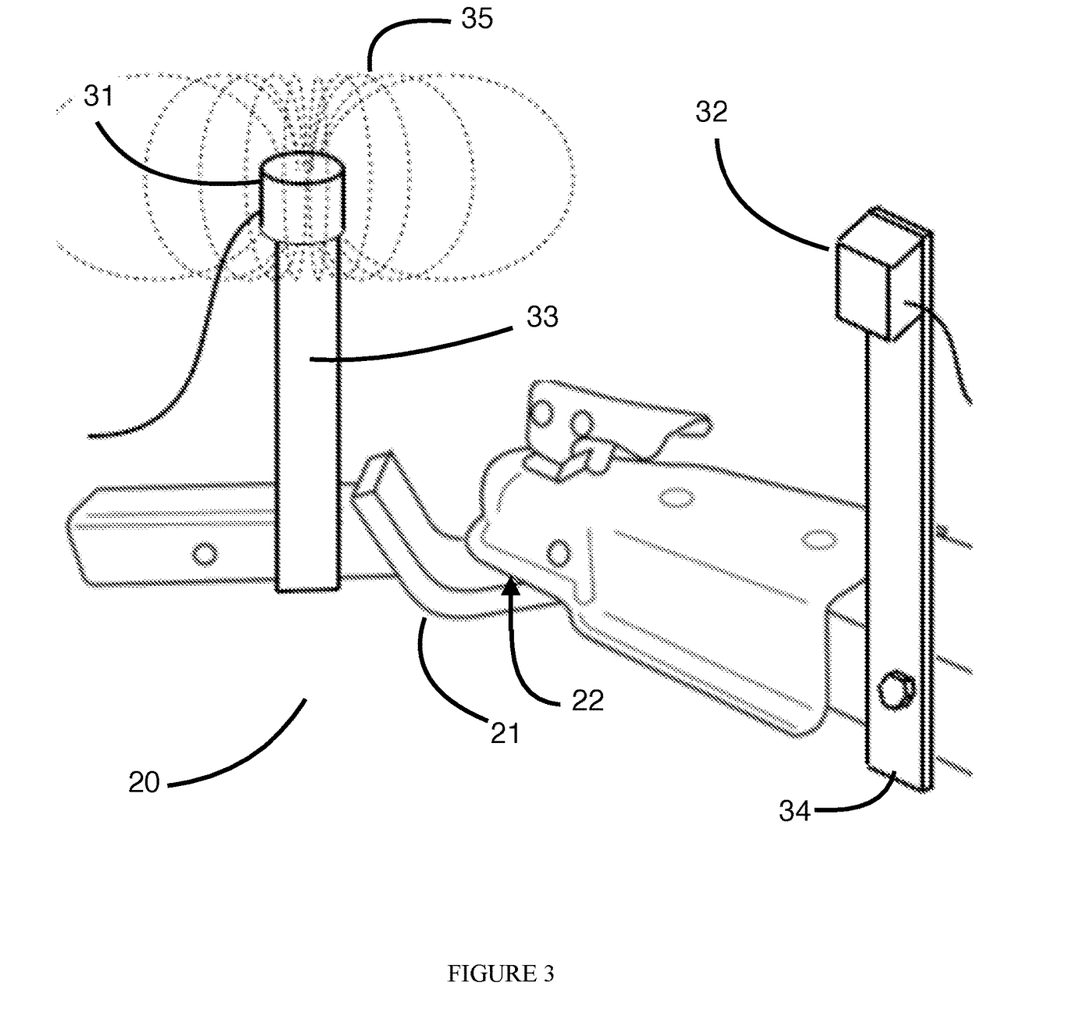
FIG. 3 depicts a vehicle hitch receiver with a hitch ball having a mounted electromagnet and a trailer tongue coupler having a mounted magnetometer according to a preferred embodiment of the present invention.

As depicted in FIG. 2, a hitch receiver 20 consists of a hitch ball mount 21 and a hitch ball 22. FIG. 3 shows a hitch receiver 20 that consists of a hitch ball mount 21 and a hitch ball 22 after mounting electromagnet 31 and a 3, 6, or 9 degree of freedom inertial measurement unit (IMU) 32 thereon (consisting of a 3-axis magnetometer, and typically a 3-axis accelerometer, and optionally a 3-axis gyroscope) using mounting arms 33 and 34. The IMU 32 comprises a magnetometer that measures the strength of magnetic field 35 in the x, y, and z directions (each direction being perpendicular to the other two). If the system will be initialized when stationary on a level surface as described herein, the gyroscope portion can be omitted. If the system will be initialized on a level surface as described herein and the orientation of the magnetometer on the trailer is known (e.g., can be factory or user oriented and/or calibrated), the accelerometer portion can be omitted as can one of the three axes of the magnetometer (specifically, the z axis corresponding to the axis perpendicular to the ground of the x, y, and z magnetometer).

The electromagnet can be continuously energized and the magnetometer will be able to measure the direction to the electromagnet and, by doing so, can compute the angle at the hitch ball. However, the earth's magnetic field will also be picked up by the magnetometer, so the magnetic field from the electromagnet will need to overwhelm the earth's magnetic field. To do this, the electromagnet would need to be both powerful and close to the magnetometer (the magnetic field strength drops off in proportion to the square of the distance from the electromagnet). To facilitate greater spacing between the electromagnet and the magnetometer and to make the device less sensitive to the earth's magnetic field and other sources of magnetic interference, the electromagnet can be cycled.

To compensate for external magnetic interference, readings of the hitch angle consist of two readings by the magnetometer. The first magnetometer reading is performed with the electromagnet de-energized and the second is performed after energizing the electromagnet. If these two readings are then subtracted, all that will remain of the readings is that which is attributed to the electromagnet (and very low level magnetic and electronic circuit noise). Using standard IMU mathematics and sensor fusion techniques as are well known by those skilled in the art, the direction of gravity (z axis) is determined using the x, y, z accelerometers in the IMU (with or without using sensor fusion techniques to correct for motion of the IMU by using the x, y, z gyroscopes). From those calculations, the horizontal (x, y) plane of motion of the hitch (which is parallel to the horizontal plane of the ground when on a level surface) and the direction to the electromagnet in that horizontal plane can be determined. The system can be initialized by aligning the vehicle and trailer while stationary and on a level surface and capturing the accelerometer x, y, and z values; these values are then stored and used for determining the direction to the electromagnet in the horizontal plane of the hitch for subsequent hitch angle determinations. By doing this initialization step while stationary and on a level surface, the gyroscope values obtainable from many IMU's would not be necessary and the accelerometer values would only need to be read that one time and saved. (If the orientation of the magnetometer can be calibrated such that its installed and its in-use roll and pitch are known, the accelerometer can be omitted, too.) Initialization will also capture the hitch angle value computed according to the present invention for the device to be able to reference its 0° hitch angle.

Figure 8:
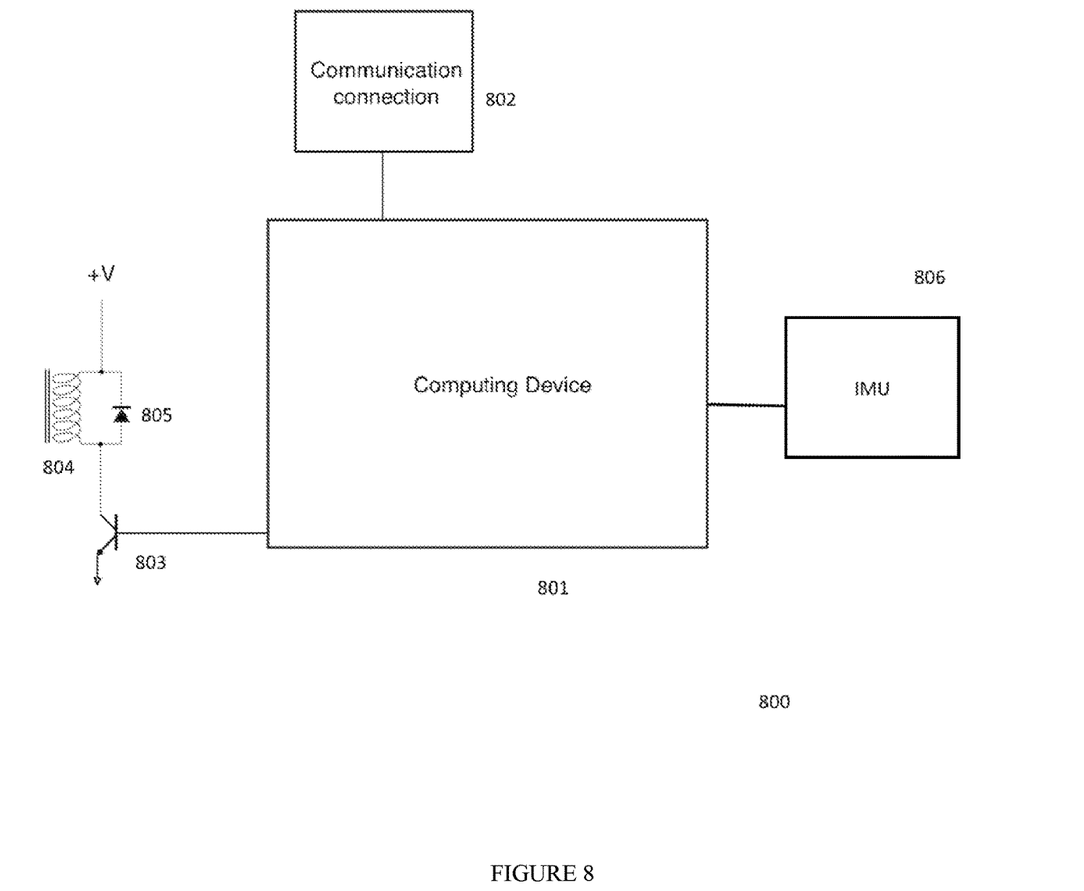
FIG. 8 depicts a magnetic sensor device and magnet device pair according to a preferred embodiment of the present invention.

Specifically, as depicted in FIG. 8, a first reading is taken using the IMU 806 comprising a raw x magnetometer value (x1), a raw y magnetometer value (y1), and a raw z magnetometer value (z1). The electromagnet 804 is then energized; this can be controlled by an output signal line from the computing device 801 to a pull-down transistor 803 to drive the electromagnet (with a diode 805 across the coil in the reverse direction to allow the coil to discharge when being turned off), as is well known by those skilled in the art. Next, a second reading is taken comprising a raw x magnetometer value (x2), a raw y magnetometer value (y2), and a raw z magnetometer value (z2). The electromagnet is then de-energized. The first raw x value (x1) is then subtracted from the second raw x value (x2), the first raw y value (y1) is then subtracted from the second raw y value (y2), and the first raw z value (z1) is then subtracted from the second raw z value (z2) to get a net value for x (x0=x2−x1), a net value for y (y0=y2−y1), and a net value for z (z0=z2−z1). The direction of the magnetic field is then calculated using the following equations, using the net values x0, y0, z0 as if x, y, z from the magnetometer. This gives us the direction to the electromagnet in the plane of motion for the hitch.

Standard IMU mathematics and sensor fusion techniques as are well known by those skilled in the art. For example, from the accelerometer x, y, and z values, roll and pitch are determined from the equations:

$$\text{roll}(\theta) = \arctan(-x/\sqrt{y^2+z^2}) \times 180/\pi \quad \text{pitch}(\phi) = \arctan(-y/\sqrt{x^2+z^2}) \times 180/\pi$$

from which intermediate calculations are made:

$$A = \cos(\phi) \, B = \sin(\phi) \, C = \sin(\theta) \, \& \, D = \cos(\theta).$$

Fortunately, these mathematically intensive computations can be done one time at initialization with the values A, B, C, and D being stored. Thereafter, as long as the position of the magnetometer remains fixed on the trailer where it was during initialization, the direction to the electromagnet is determined more simply using the magnetometer x, y, and z net values:

$$\text{direction}(\partial) = \arctan[(yD-zC) \div (xA+yCB+zDB)]$$

(For reference, see Pomona web page: https://cs.pomona.edu/classes/po181u/docs/labs/lab9/).

Figure 5:
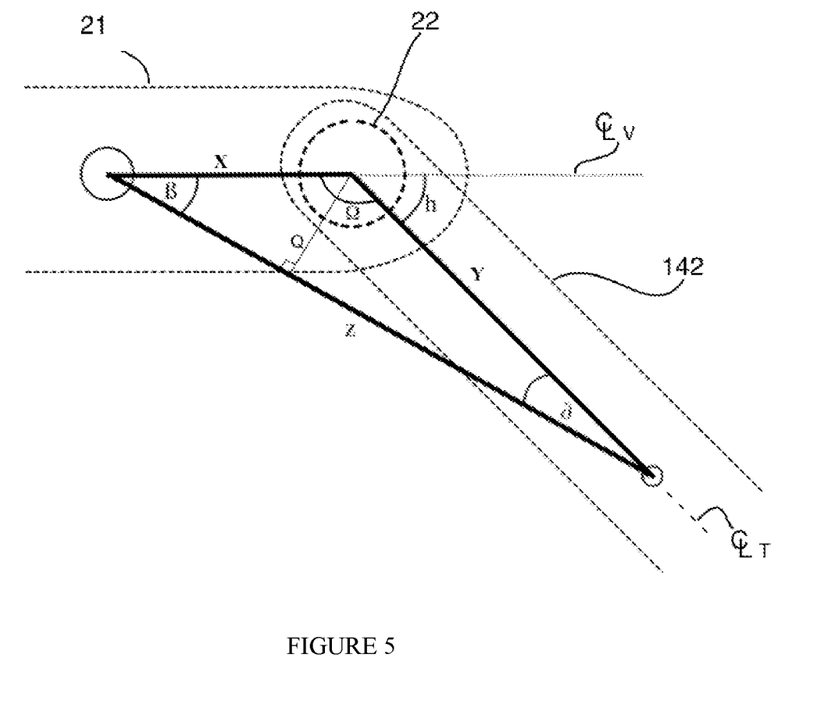
FIG. 5 depicts the hitch angle sensor geometry according to a preferred embodiment of the present invention (and as was presented as FIG. 8 in the '009 patent).

Once we have the direction ($\partial$) to the electromagnet mounted on the vehicle (e.g., on hitch ball mount 21), the angle at the hitch ball 22 (i.e., the hitch angle, h) is computed using the distance between the electromagnet and the hitch ball, X, and the distance between the magnetometer and the hitch ball, Y, as shown in FIG. 5 and described in more detail in the '009 patent (reproduced here from FIG. 8 therein):

hitch angle($h$)=Sin$^{-1}$($Y/X$ Sin($\Theta$))+$\partial$ where the hitch angle is formed by the intersection of the centerline of the trailer (ST) or a line parallel thereto and the centerline of the vehicle ($\sphericalangle_V$) or a line parallel thereto.

The first and second readings should typically be spaced apart in time by at least the amount of time required to energize or de-energize the electromagnet as computed by well known equations for calculating the time constants of RLC circuits. The first and second readings can be taken closer together, but waiting for the electromagnet to become fully energized or de-energized will provide a stronger magnetic signal to read for more a accurate result. It is preferable that the state of the electromagnet be switched immediately after reading the magnetic field such it may stabilize while the calculations are being made.

For a greater sampling rate, after taking a first reading (with the electromagnet off) and a second reading (with the electromagnet on) to get one directional result, each subsequent directional result can be taken with only one additional reading. After taking the first and second readings, the electromagnet is de-energized and a third reading is taken. This third reading (with the electromagnet off) can now be used in conjunction with the second reading to compute a second set of x0, y0, z0 values by subtracting the third reading from the second reading where x0'=x2−x3, y0'=y2−y3, and z0'=z2−z3. Continuing on, a fourth reading (with the electromagnet on) can now be used with the third reading to compute a third set of x0, y0, z0 values by subtracting the third reading from the fourth reading where x0"=x4−x3, y0"=y4−y3, and z0"=z4−z3, etc. This will result in needing only a number of readings, n, to compute n-1 sets of x0, y0, z0 values (for simplicity, when the sensor device knows the state of the electromagnet because it is controlling the state, a convention is adopted where the de-energized reading of each pair of samples is subtracted from the energized reading, but this is not mandatory).

It is desirable, but not required, that the mounting of the electromagnet and IMU comprising the magnetometer should be made such that the electromagnet and IMU are spaced apart from any components of the hitch and trailer coupler that can conduct magnetism (such as iron containing material) to minimize distortion of the electromagnet's magnetic field. Mounting the electromagnet and IMU on aluminum or plastic mounts 33 & 34, as depicted in FIG. 3, can provide spacing from iron hitch components. Shaping the IMU mount 34 can also make it possible to position the magnetometer closer to the axis of rotation of the hitch ball to improve accuracy.

As is well understood by those skilled in the art of IMU's, hard and soft iron corrections can be made and these corrections can be made with or without these spacing mounts 33 & 34. These corrections can also be determined during the normal use of the vehicle and trailer assuming that the other parameters for calculating turning radii have been inputted. In particular, with a trailer "backup" system, the components for measuring the amount of steering, the hitch angle, and the forward motion can be kept operational when the vehicle is driving forward. The instantaneous turning radius of the vehicle can be determined from the steering of the vehicle and the wheelbase while in forward motion. The raw value for hitch angle can measured and can be monitored while driving forward to verify that it is not changing (which indicates that the trailer is turning with the same turning radius as the vehicle). From this turning radius along with the trailer length, the hitch angle of the trailer can be calculated and a map (i.e., a lookup table) can be constructed to relate the measured raw hitch angle to an actual hitch angle computed from the forward driving turning radius.

This is because if a vehicle is moving while neither the vehicle's turning radius nor the trailer's turning radius are changing, the system must have achieved equilibrium and the vehicle turning radius must equal the trailer turning radius. When driving in a forward direction while towing a trailer, the trailer naturally settles into place behind the vehicle and follows on the same turning radius. If, as the vehicle moves forward, the rear wheels of the trailer are positioned farther away from the center of the circle (i.e., on a greater turning radius), they will naturally migrate toward the center of the circle as the vehicle travels forward until they attain a matching turning radius. If the rear wheels of the trailer are positioned closer to the center of the circle (i.e., on a smaller turning radius), they will naturally migrate away from the center of the circle as the vehicle travels forward until they attain a matching turning radius. Equilibrium occurs where the vehicle's turning radius equals the trailer's turning radius at which point the hitch angle will not change.

Forward motion of the vehicle can be verified by monitoring the yaw of the vehicle (e.g., by using a magnetic compass in the vehicle) where a changing heading indicates that the vehicle is moving (either forward or backwards); this can be done using an IMU attached to the vehicle. The steering of the vehicle is measured and used to determine if the vehicle is moving forward or reverse (e.g., while the vehicle is steered to the right, if the heading is changing in a clockwise direction, the vehicle is moving forward, but if the heading is changing in a counter-clockwise direction, the vehicle is reversing; while the vehicle is steered to the left, if the heading is changing in a counter-clockwise direction, the vehicle is moving forward, but if the heading is changing in a clockwise direction, the vehicle is reversing). If the heading is not changing or is changing minimally, a plurality of steering measurements must be used to determine if the vehicle is traveling along a constant turning radius.

When the vehicle is driving forward on a constant turning radius while the hitch angle measurement is not changing or is changing very minimally (i.e., system noise), the hitch angle can be determined. This is done by calculating the turning radius of the vehicle to determine the effective turning radius of the trailer, and then calculating the hitch angle.

During normal forward driving operations while the trailer is coupled to the vehicle and all inputs have been entered, there will be moments during which the vehicle and trailer will be on an identical turning radius (i.e., the steering is unchanged or minimally changed, the hitch angle is unchanged or minimally changed, and the vehicle is moving forward). At these moments, the hitch angle is computed from the turning radius and compared to the corresponding unadjusted hitch angle measurement. The difference between the computed hitch angle and the measured hitch angle is then incorporated (e.g., by averaging or low pass filtering) into a lookup table value corresponding to that measured hitch angle such that subsequent measured hitch angle values can be adjusted by that table value to obtain a more accurate hitch angle value. Furthermore, this table lookup adjustment technique can replace the computation to determine the hitch angle while adjusting for the sensor and electromagnet being positioned away from the hitch ball by using the direction from the magnetometer in the sensor to the electromagnet and then, with this angle at the sensor, compute the angle at the hitch as taught in the '009 patent application. Any missing values can be made up for by interpolation until the forward driving table construction just described fills them in. Any portion or portions of the table can be reported to the driver to assist in filling the table by indicating a turning radius to drive to enable the system to capture that data and fill in that portion of the table. The table can be stored in volatile memory in which case it will need to be regenerated each time the system is energized or, preferably, it can be stored in non-volatile memory in which case an additional input would have to be provided to reset the table in case the setup is changed (e.g., if the position of the sensor and/or electromagnet is moved). (Changing minimally or minimally changed as used herein, it is meant that the change is so small that any differences in subsequent calculations will be on the order of system noise or so small as to not affect the operation and usefulness of the system to the operator.) This lookup table technique typically will not be necessary given the application of well known techniques for hard and soft iron corrections and the dual reading with subtraction technique being taught herein.

Because magnetometers read in quantized steps and do not have infinite resolution, due to the geometry of the setup as depicted in FIG. 5, precision is improved by placing the magnetometer closer to the hitch ball (distance Y) on the trailer coupler or tongue 142 and by placing the electromagnet farther from the hitch ball (distance X) on the vehicle's hitch receiver or hitch ball mount 21. Also, the variability of the distance between the magnetometer and the electromagnet is greater as the magnetometer is positioned further from the hitch ball so positioning the magnetometer closer to the hitch ball minimizes the drop in magnetic field strength (particularly as the vehicle and trailer approach alignment when the magnetometer and the electromagnet would be farthest apart). However, the strength of the magnetic field diminishes according to the distance from the electromagnet squared. So it is necessary to position the magnetometer as close as possible to the hitch ball and the electromagnet as far as possible from the hitch ball while not positioning the electromagnet so far from the hitch ball that the magnetic field strength at its weakest point is not detectable above the noise level given the quality and resolution of the magnetometer. While a strong magnetic field from the electromagnet is desirable, the magnitude value of the field is typically discarded after the direction to the electromagnet is determined; but, the field must be strong enough to be detectable above the noise level given the quality and resolution of the magnetometer.

In the above description (note generalized circuit in FIG. 8 showing pair 800 of devices comprising a sensor device and a magnet device that are wired together), the magnetometer reading and electromagnet switching are controlled by the magnetometer sensor device which has an output that controls switching an electromagnet on and off by communicating a voltage signal to transistor 803, either by a connection to a wired magnet device comprising an electromagnet 804 and a drive circuit 803 & 805 or connected wirelessly to a separate magnet device (which looks like the generalized circuit of FIG. 8 without the IMU 806). This allows the computing device 801 to know the state of the electromagnet. The sensor device comprises an IMU 806 which comprises a magnetometer for reading the magnetic field, a computing device 801 for performing calculations, and a communicating device 802 for sharing the resulting hitch angle calculation with other parts of a system or other devices, and may engage in communicating electromagnet on-off command signals when the sensor device is connected wirelessly to a separate magnet device (which would receive the command signal and then communicate a voltage signal to its electromagnet drive circuitry); the electromagnet 804 is mounted on the opposite side of the hitch ball from the magnetometer and is connected by a wire (which may be inconvenient for users of the system because the wire must be connected when coupling the vehicle to the trailer and disconnected when uncoupling) or connected wirelessly (for greater end-user convenience). However, it is possible to decouple the electromagnet switching from the IMU unit and allow the electromagnet (with associated switching and timing circuitry as can be provided by a microcomputer chip with circuits to drive the electromagnet) to be free-running. A free-running magnet device would look like the generalized circuit of FIG. 8, but without the Communication connection 802 or the IMU 806. It is expected that a free-running magnet device would draw its power from the vehicle and, in particular, from the vehicle's backup lights circuit (so that it is only operating when the vehicle is in reverse) or from a separate switched circuit (so that it can be powered only when needed). If powered from a separate switched circuit, the switching can be controlled by a separate system, such as a trailer backup control system, such that it is automatically powered only when needed.

Figure 6:
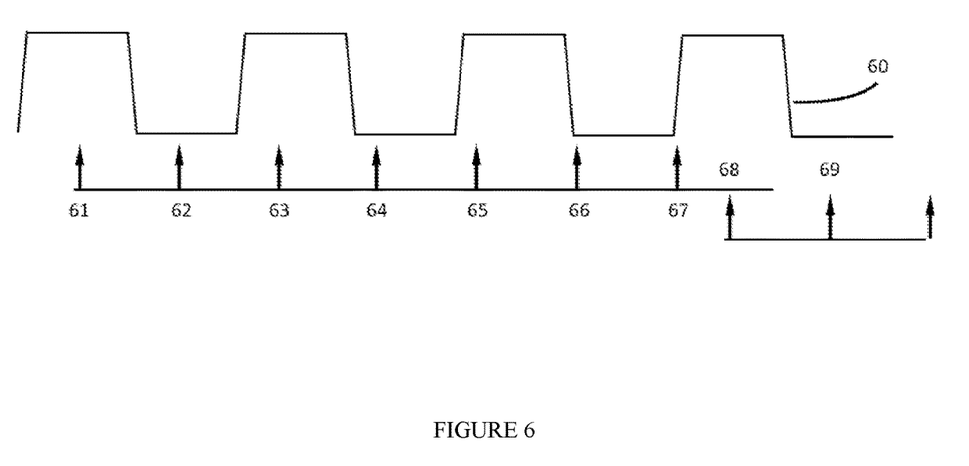
FIG. 6 depicts the timing of sampling when the electromagnet is free-running where the sample rate is slightly faster than the free-running rate.

In a preferred variation, the electromagnet would be free running and the sensor would synchronize with the electromagnet duty cycle and lock onto the high and low energized periods. In this variation, as depicted in FIG. 6, the cycling of the electromagnet is represented by waveform 60 where a high level represents the electromagnet is energized and a low level represents the electromagnet is de-energized. For the purpose of example, the electromagnet is cycling at 20 Hz so as to not generate spurious electromagnetic radiation (the RLC of the electromagnet energizing circuitry is naturally a low pass filter) resulting in a waveform of approximately 25 mSeconds high alternating with 25 mSeconds low. The magnetometer samples are each represented by an arrow (marked 61 through 69). The rate for these samples is slightly faster than the electromagnet cycling rate (allowing for fluctuations in the rate due to temperature, component tolerances, and the like as well as fluctuations in the sampling rate due to temperature, component tolerances, processing delays, and the like). In other words, the sampling rate is guaranteed to be ever so slightly faster than the electromagnet cycling rate. In FIG. 6, for the sake of this example, the sample points are evenly spaced at a sample rate of about 23 mSeconds. As can be seen, samples 61 through 66 can be processed according to the teaching above just like when the sensor device controls the electromagnet switching. However, when sample 67 is read and sample 66 is subtracted to get a net value, the net value has a small magnitude. The small magnitude is determined by comparing the net value to a threshold and if the net value is out of range (i.e., as in this example, is lower than the threshold value) this lets the sensor device know it sampled proximate to an electromagnet transition. As a consequence, the sensor device discards sample 67 and its associated net value, delays for one quarter of the electromagnet cycle time (or 12.5 mSeconds), and resumes sampling at a sample rate of about 23 mSeconds. Sample 68 is then taken and has sample 66 subtracted from it to get the net value to replace the discarded net value and sampling continues.

While the above generally teaches how this variation works, this variation can benefit by adjusting the delay from what was just described when encountering a net value having a small magnitude. When sampling at an evenly spaced rate that is slightly faster than the electromagnet switching rate, each sample occurs at a slightly earlier point in the electromagnet wave form. In the example, sample 67 has advanced in the waveform to where it occurs during a rising edge. Delaying exactly one half of an electromagnet switching period would cause the next sample to occur on the following falling edge (which would also be problematic). However, if the delay is one half of an electromagnet switching period minus the greater of one rise time (i.e., turn-on time) or fall time (i.e., turn-off time) the delay would be longer (e.g., 22 mSeconds if the transitions each took 1 mSecond), but there would be about twice as many samples collected before encountering another net value having a small magnitude than would be collected when delaying for one quarter of the electromagnet cycle time. Delaying by one half of an electromagnet switching period minus one rise time and minus one fall time would give a bit of cushion. Of course, the delay would have to be at least one transition time to ensure the sample would occur beyond the transition that triggered the delay decision making. In other words, the delay should be between the greater of one rise or fall time (at the short end) and one half of an electromagnet switching period minus the greater of one rise or fall time (at the long end) with the longer delay being preferable. Building in a bit of cushion, the delay should be between one rise time plus one fall time (at the short end) and one half of an electromagnet switching period minus the sum of one rise time plus one fall time (at the long end).

Figure 7:
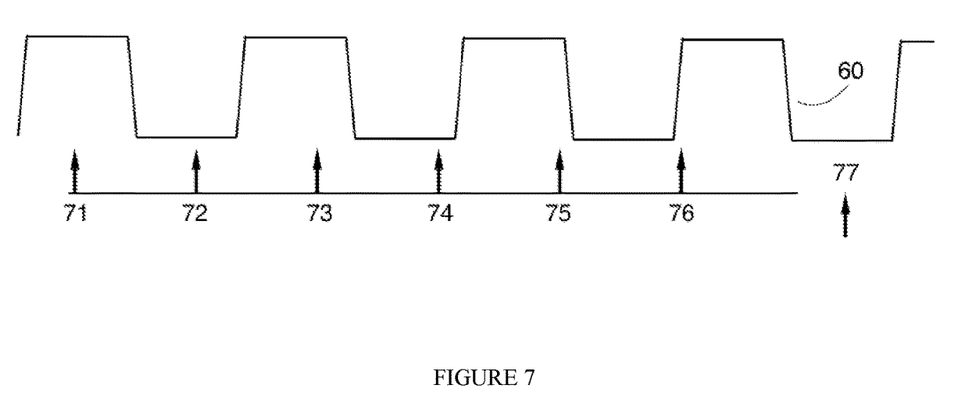
FIG. 7 depicts the timing of sampling when the electromagnet is free-running where the sample rate is slightly slower than the free-running rate.

Note that it is also possible to sample at a slower evenly spaced rate (e.g., in the above example, at a sample rate of about 27 mSeconds) and when a net value having a small magnitude is encountered, the sensor device would discard that latest sample and its associated net value, delay for three quarters of the electromagnet cycle time (or 37.5 mSeconds), and resume sampling at a sample rate of about 27 mSeconds. Again, the cycling of the electromagnet is is represented by waveform 60 where the electromagnet is cycling at 20 Hz. The magnetometer samples are each represented by an arrow (marked 71 through 77). The rate for these samples is slightly slower than the electromagnet cycling rate (again allowing for fluctuations in the rate due to temperature, component tolerances, and the like as well as fluctuations in the sampling rate due to temperature, component tolerances, processing delays, and the like). But, as is depicted in FIG. 7, when the samples are slowly getting later in the electromagnet cycle, the delay must be longer to make a sampling correction. As can be seen, samples 72 through 75 are successively later in the electromagnet cycle. Sample 75 samples an energized reading but 76 is slowed to where it also samples an energized reading and subtracting the two yields a net value of zero. To get back on track, sample 76 is discarded and the next sample 77 occurs after an additional ¾ of an electromagnet cycle. An improvement can be made—the delay can be between one half of an electromagnet switching period plus the greater of one rise or fall time (at the short end) and one full electromagnet switching period (at the long end) with the shorter delay being preferable. Building in a bit of cushion, the delay should be between one half of an electromagnet switching period plus one rise time plus one fall time (at the short end) and one full electromagnet switching period minus the greater of one rise or fall time (at the long end).

Figure 4:
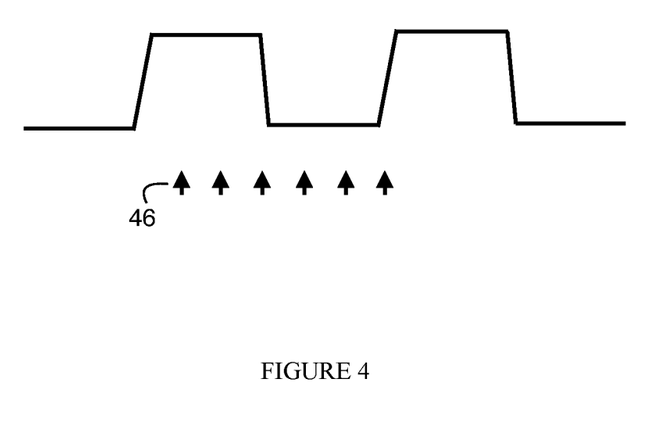
FIG. 4 depicts the timing of readings sampled by the magnetometer.

In an alternate variation represented by FIG. 4, if the electromagnet is free-running between the on and off states with a 50% duty cycle and known frequency, the sensor can sample at greater than two times the free-running rate and still determine the direction of the magnetic field. For example, if the sensor takes samples at three times the free-running rate, the sensor will take six readings 46 for each cycling 41 of the electromagnet. The worst case scenario would have the first two of the six readings (x1, y1,z1 & x2,y2,z2) occurring during the electromagnet on time, the third of the six readings (x3,y3,z3) occurring during the on-to-off transition of the electromagnet, two of the six readings (x4,y4,z4 & x5,y5,z5) occurring during the electromagnet off time, and the last of the six readings (x6,y6,z6) occurring during the off-to-on transition of the electromagnet. The electromagnet must transition and settle from stably off to stably on in less than ⅙th of the electromagnet cycle time and must also transition and settle from stably on to stably off in less than ⅙th of the electromagnet cycle time. Every third reading would be used to compute a sample so:

$$x0 = x1 - x4, y0 = y1 - y4, \& \ z0 = z1 - z4$$

$$x0' = x2 - x5, y0 = y2 - y5, \& \ z0 = z2 - z5$$

$$x0'' = x3 - x6, y0 = y3 - y6, \& \ z0 = z3 - z6$$

One of these samples may have bad data (x0"), but this is detectable because its magnitude will be lower than the others. For example, if the readings taken during the transition were taken in the middle of the transition, the contribution from the electromagnet will be at half strength for both and will cancel. On the other hand, if the readings were taken near the beginning of the transition, the contribution from the electromagnet for the one taken during the off-to-on transition will be small and the contribution from the electromagnet for the one taken during the on-to-off transition will be larger; the result will be the larger component less the smaller component for a weak value. However, the direction computed will still be correct. To ensure the resulting value is sufficiently above the noise level, discarding any value that is less than half the average value is a useful rule of thumb.

In all of the above cases, once a value is obtained for the hitch angle, this hitch angle value is then provided to other parts of any system that uses the present invention as its means to measure and obtain the hitch angle. This providing to other parts of a system includes but is not limited to having the magnetic sensor device use the value itself by performing additional tasks and/or calculations that take the hitch angle as an input, communicating the angle value or values to other devices or parts of a system or systems over a wired connection or over a wireless connection (802 in FIG. 8) such as Wifi, Bluetooth, cellular, Zigbee, or the like.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A device for measuring an angle formed by a connection between a vehicle and a trailer, the connection having a first side and a second side wherein the first side and the second side are movable relative to each other about an axis of rotation that is generally perpendicular to the ground, wherein the angle is found at a point wherein a centerline of the trailer or a line parallel thereto and a centerline of the vehicle or a line parallel thereto intersect, comprising:
- a computing device,
- a sensor device that is attached to the first side of the connection, and
- a magnet device that is attached to the second side of the connection,
- wherein the magnet device comprises a magnetic field source,
- wherein the magnetic field source can be switched on and off,
- wherein the sensor device comprises a magnetic field sensor that measures a magnetic field's magnitude in at least a first and a second coordinate direction,
- wherein the computing device receives measurements from the magnetic field sensor of the magnetic field's magnitude in at least the first and the second coordinate direction with the magnetic field source switched on and measurements from the magnetic field sensor of the magnetic field's magnitude in at least the first and the second coordinate direction with the magnetic field source switched off, and
- wherein the computing device determines a value for the angle by performing a calculation comprising: calculating a difference between the magnetic field's magnitude in the first coordinate direction with the magnetic field source turned on and the magnetic field's magnitude in the first coordinate direction with the magnetic field source turned off, and calculating a difference between the magnetic field's magnitude in the second coordinate direction with the magnetic field source turned on and the magnetic field's magnitude in the second coordinate direction with the magnetic field source turned off.

2. The device of claim 1 wherein the magnetic field source comprises a mechanically switchable magnet.

3. The device of claim 1 wherein the magnetic field source comprises an electromagnet.

4. The device of claim 1 wherein the magnetic field source is automatically cycled.

5. The device of claim 4 wherein the automatic cycling of the magnetic field source is controlled by the sensor device.

6. The device of claim 5 wherein the sensor device communicates a signal to the magnet device that causes the magnetic field source to switch on or off.

7. The device of claim 6 wherein the signal to the magnet device is communicated wirelessly or over a wired connection.

8. The device of claim 4 wherein the automatic cycling of the magnetic field source is controlled by the magnet device.

9. The device of claim 4 wherein the computing device's determination of the value for the angle further comprises determining a value for the magnetic field's magnitude in the direction of the angle.

10. The device of claim 9 wherein the value for the magnetic field's magnitude in the direction of the angle is compared to a threshold value.

11. The device of claim 10 wherein the computing device's determination of the value for the angle is discarded if the value for the magnetic field's magnitude in the direction of the angle is below the threshold value.

12. The device of claim 10 wherein whichever occurs second of (a) the measurements from the magnetic field sensor with the sensor turned on and (b) the measurements from the magnetic field sensor with the sensor turned off is then used as one of two measurements from the magnetic field sensor by a subsequent determination of a value for the angle.

13. The device of claim 4 wherein the sensor device measures a magnetic field's magnitude in at least a first and a second coordinate direction automatically at a frequency that is different than the frequency by which the magnetic field source is automatically cycled.

14. The device of claim 1 wherein a hitch ball is proximate to the point wherein the centerline of the trailer and the centerline of the vehicle intersect and the computing device performs the calculation for determining the value of the angle using a collection of input values comprising a value representing a horizontal distance from the sensor device to the hitch ball and a value representing a horizontal distance from the magnetic device to the hitch ball.

15. The device of claim 1 further comprising an accelerometer wherein the computing device reads one or more values from the accelerometer to determine an orientation of the magnetic field sensor.

16. The device of claim 15 wherein the one or more values read from the accelerometer are read during an initialization step and stored for use in a plurality of subsequent calculations.

* * * * *